United States Patent [19]

Meier et al.

[11] 4,339,273
[45] Jul. 13, 1982

[54] PROCESS FOR PRODUCING A FIBER-REINFORCED, HYDRAULICALLY SETTING COMPOSITION, THE COMPOSITION PRODUCED AND THE USE THEREOF

[75] Inventors: Peter E. Meier, Wädenswil; Otto W. Gordon, Oberurnen; Gero Büttiker, Hirzel, all of Switzerland

[73] Assignee: Ametex AG, Niederurnen, Switzerland

[21] Appl. No.: 234,912

[22] Filed: Feb. 17, 1981

[30] Foreign Application Priority Data

Feb. 22, 1980 [CH] Switzerland .................... 1440/80

[51] Int. Cl.³ .............................................. C04B 7/35
[52] U.S. Cl. ........................................ 106/90; 106/99; 524/5; 524/2; 524/6
[58] Field of Search ............... 106/90, 99; 260/29.6 S

[56] References Cited

U.S. PATENT DOCUMENTS

| | | | |
|---|---|---|---|
| 4,082,563 | 4/1978 | Ellis et al. | 106/90 |
| 4,101,335 | 7/1978 | Barrable | 106/99 |

*Primary Examiner*—James Poer
*Attorney, Agent, or Firm*—Weingarten, Schurgin & Gagnebin

[57] ABSTRACT

Asbestos-free, fiber-reinforced, hydraulically setting compositions can be processed to fiber-reinforced shaped articles. The compositions are obtained by mixing fibers, hydraulic binders and water-soluble or water-emulsifiable polymers and by adding a metallic compound, particularly a metal salt or hydroxide. The composition can be processed in the equipment conventionally used in the asbestos cement industry.

10 Claims, 2 Drawing Figures

PROCESS FOR PRODUCING A FIBER-REINFORCED, HYDRAULICALLY SETTING COMPOSITION, THE COMPOSITION PRODUCED AND THE USE THEREOF

FIELD OF THE INVENTION

The present invention relates to a process for producing a fiber-reinforced, hydraulically setting composition, to the composition produced in this way and to the use thereof in the production of fiber-reinforced shaped articles.

BACKGROUND OF THE INVENTION

Asbestos-reinforced cements have been widely used in a satisfactory manner in the building materials field for a number of decades. The building industry uses on a large scale a number of different processes for producing shaped articles such as pipes, corrugated boards and roofing slates, examples of the processes being the well known Magnani machine (cf Herbert Hiendl, "Asbestzementmaschinen", p. 42, 1964) and the equally well known Hatschek machine (see below). A preferred process, namely the winding process, an example of which is the Hatschek device, has been known for many decades (Austrian Pat. No. 5,970).

These known processes for producing articles such as asbestos cement pipes and boards are based on the use of specific dilute asbestos cement suspension in cylinder paper machines. The suspension is applied to a felt in fleece form via a drawing tank with the aid of a cylindrical-shaped screen and is wound to the desired thickness on size rollers or tubular cores.

For the production of corrugated boards, the asbestos cement fleece can be cut from the size roller on reaching the desired thickness and placed between lubricated corrugated metal sheets for setting purposes.

Over the last few years, it has been found that the asbestos which has been satisfactorily used in the known asbestos cement suspensions is not available in unlimited quantities and must be included among those natural materials whose supplies will probably be exhausted relatively soon. In addition, the deposits of workable asbestos are also only found in a few countries, which can in turn lead to undesired dependence problems.

Therefore, attempts have been made to find processes enabling the machines widely used in the asbestos cement industry to produce fiber-reinforced cement products without asbestos. Examples of such processes are described in published German patent applications 2,819,794, 2,816,457, 2,854,967 and 2,854,506, and in U.S. Pat. NO. 4,101,335. In all of these processes, operating on a basis of aqueous fiber-cement suspensions, an attempt is made to simulate the special characteristics of asbestos in the system by means of a mixture of different fiber types. The two most important characteristics of asbestos, upon which all drainage processes are based are: excellent filtration action, that is, the retaining capacity for cement; and the high strength of the asbestos fibers for providing a reinforcing action in the end product. Thus, it is a characteristic of known processes for producing asbestos-free fiber cement products on conventional machines to operate with mixtures of at least two different fiber types, one fiber type primarily for providing the filtering action and the second fiber type to provide reinforcement for the end product. The combination of the two fibers is an attempt to produce an end product equivalent to that using asbestos fibers.

Numerous different synthetic and natural fibers in cut lengths of 5 to 25 mm have been proposed as reinforcing fibers. Thus, fibers made of materials such as cotton, silk, wool, polyamide, polyester and polypropylene have been used, together with inorganic fibers such as those of glass, steel and carbon to provide the reinforcement. The following fibers, having primarily a filtering function, have previously been used: all types of cellulose, which may be in the form of pulp, mechanical wood pulp, waste paper, sawdust and waste from garbage disposal plants. In addition, "fibrides" based on polypropylene have been used, as well as inorganic filter fibers such as kaolin, rock or slag wool.

All hitherto known processes functioning with the aid of fiber systems which, in addition to the reinforcing fibers, also contain filtration fibers for the cement retaining capacity, have disadvantages. The relatively high proportion of filter fibers of 10 to 20% by volume required to ensure the necessary cement retaining capacity leads to undesired side-effects in the hydraulically setting or hardening matrix. The porosity of the products is increased and the contact between the reinforcing fibers and the binder is reduced, which leads to a reduction of product strength. If, in addition, cellulose-based filter fibers are used, the high swellability of such filtration systems mainly lead to a very considerable difference between the wet and dry strengths of the fiber cement products.

It would therefore be desirable to carry out production on the drainage systems used in the asbestos cement industry without filter fibers, that is, with reinforcing fibers only.

SUMMARY OF THE INVENTION

It is an object of the present invention to provide a fiber-reinforced, hydraulically setting composition having characteristics substantially equivalent to asbestos-reinforced cement for the production of shaped articles of manufacture.

It has now been found that it is possible to produce fiber-reinforced cement products on the drainage systems used in the asbestos cement industry from dilute aqueous suspensions of cement and reinforcing fibers by using water-soluble or water-emulsifiable polymer, or both, combined with metallic compounds.

In prepared embodiments of the inventive process for producing a fiber-reinforced, hydraulically setting composition, 0.5 to 20% by volume of the defined fibers are used, together with the necessary quantity of hydraulic binder and 0.01 to 10% by weight of metallic compound.

BRIEF DESCRIPTION OF THE DRAWING

The objects, advantages and features of the invention will be more readily appreciated from the following detailed description when read in conjunction with the accompanying drawing, in which.

DESCRIPTION OF THE PREFERRED EMBODIMENTS

The process according to the invention for producing compositions is illustrated in the following manner. The fibers used can be all known organic and inorganic reinforcing fibers, such as glass, steel, carbon, aramide, polypropylene, polyvinyl alcohol, polyester, polyamide or polyacrylate fibers. In order that a reinforcing fiber can fulfill its function, a minimum elongation at break of generally <10% is required in addition to a maximum tensile strength. The cement fiber mixture contains reinforcing fibers in the quantities of 0.5 to 20% by volume, preferably 2 to 8% by volume. The reinforcing fibers are preferably admixed in cut lengths of up to 25 mm. It is possible to use either individual fibers of the same length or a mixture of fibers of different lengths. It is also possible to use ground fibers. The titer of the individual fibers can vary within a wide range, but is preferably 0.5 to 6 dtex.

The hydraulically setting binder considered suitable for the invention is understood to mean a material containing an inorganic cement and/or an inorganic binder or adhesive hardened by hydration. Particular examples of suitable binders hardened by hydration are Portland cement, high alumina cement, iron Portland cement, trass cement, blast furnace cement, gypsum, calcium silicates resulting from autoclaving and combinations of the individual binders. Further additives and fillers such as fly ash, quartz, pearlite, rock wool or cellulose and mixtures thereof are used in addition to the binders.

Suitable examples of water-soluble or water-emulsifiable polymers are alginates, polyacrylates, polyacrylamides, polyvinyl alcohol, polysaccharides and polypeptides. Water-soluble polymers of acrylamide of the most varied molecular weights and saponification factors, like those commercially available are particularly suitable. An example of such a polymer is sold under the trade name Separan by Dow Chemical. The most varied copolymers are suitable as acrylate emulsions, examples being those sold by Rohm and Haas under the trade name Primal. It is necessary for obtaining a good flocculating capacity of aqueous acrylic emulsions that those emulsions flocculate in an alkaline, slag-containing cement dispersion. This means that the emulsifier system of such emulsions no longer has a stabilizing action in an aqueous cement dispersion under the indicated conditions. These conditions can be fulfilled by anionic emulsifier systems which are not compatible with calcium ions, as an example.

Preferred metallic compounds for the process of the invention are metal sulphates, particularly aluminum sulphate or iron sulphate. However, highly satisfactory effects are obtained with hydroxides freshly precipitated or dissolved and reprecipitated in the cement suspension, for example, those of aluminum sulphate and calcium hydroxide or similar precipitations of iron or zirconium sulphate.

Figure 1:
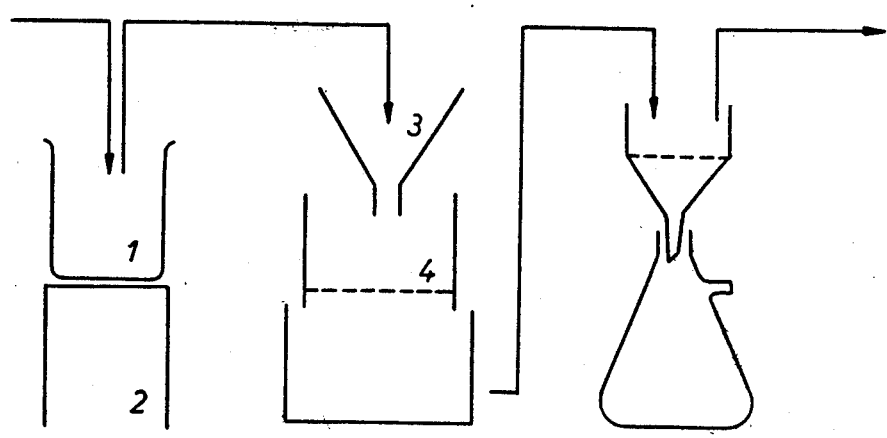
FIG. 1 is a schematic representation of apparatus employed for performing filtration tests on compositions prepared in accordance with the teachings of this invention.

The inventive process, particularly the surprising pronounced precipitation or flocculation of a dilute fiber/cement suspension with the aid of water-soluble or water-emulsifiable polymers will now be illustrated by means of a number of filtration tests. The choice of the examples given in no way restricts the scope of the invention. The filtration tests were performed on the arrangement shown in FIG. 1 in the following manner: 100 ml of water and the quantities given in Table 1 of Dralon fibers and the various additives were introduced into beaker 1. Dralon is a trademark of Bayer AB for a polyacrylnitrile material. Equivalent products may be employed as described. The individual components were homogenized for a specified time at 1000 r.p.m. by means of the magnetic stirrer 2, in the manner defined in Table 1. The mixture was then poured directly into funnel 3 and allowed to drip onto the 0.5×0.3 mm wire sieve 4, having a wire thickness of 0.28 mm. After all the water had dripped off, the undersize material from the sieve was suction filtered on a black band filter, dried for 6 hours at 110° C. and weighed.

TABLE 1

Performing the mixtures for the filtration tests.

| Test No. | Quantity in g | Quantity in %, based on PC | Component | Mixing time min. |
|---|---|---|---|---|
| 1 | | | $Al_2(SO_4)_3 18H_2O$ | 2 |
| | 0.2 | 2.6 | Dralon 6mm | 1 |
| | 0.47 | 6.0 | $Ca(OH)_2$ | 1 |
| | 7.8 | | Portland cement | 1 |
| 2 | | | $FeSO_4 7H_2O$ | 2 |
| | 0.2 | 2.6 | Dralon 6mm | 1 |
| | 0.47 | 6.0 | $Ca(OH)_2$ | 1 |
| | 7.8 | | Portland cement | 1 |
| 3 | 0.2 | 2.6 | Dralon 6mm | 1 |
| | 7.8 | | Portland cement | 1 |
| | | | Separan NP-10 | 1 |
| 4 | 7.8 | | Portland cement | 1 |
| | 0.2 | 2.6 | Dralon 6mm | 1 |
| | | | Primal N-1031 | 1 |
| 5 | 0.2 | 2.6 | Dralon 6mm | 1 |
| | 0.06 | 0.76 | $FeSO_4 7H_2O$ | 2 |
| | 0.47 | 6.0 | $Ca(OH)_2$ | 1 |
| | | | Separan NP-10 | 1 |
| | 7.8 | | Portland cement | 1 |
| 6 | 0.2 | 2.6 | Dralon 6mm | 1 |
| | 0.14 | 1.8 | $Al_2(SO_4)_3 18H_2O$ | 2 |
| | | | Separan NP-10 | 1 |
| | 0.47 | 6.0 | $Ca(OH)_2$ | 1 |
| | 7.8 | | Portland cement | 1 |

For each mixture, 100 ml of water were introduced beforehand.

Figure 2:
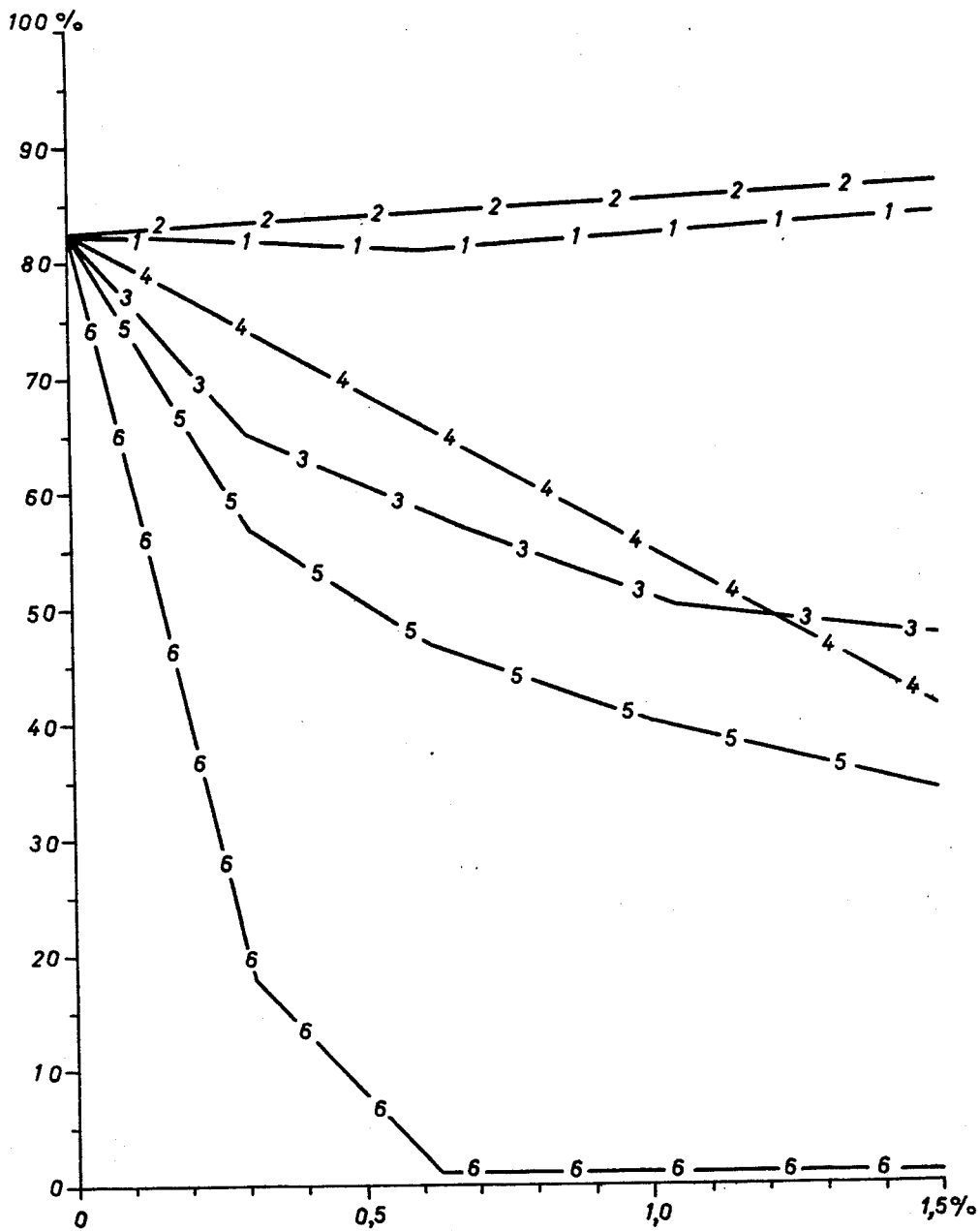
FIG. 2 is a graph showing the results of the tests of the compositions in Table 1.

The results for different quantities of flocculating systems of Table 1 are given in FIG. 2.

The filtration tests results given in FIG. 2 show on the ordinate the cement undersize relative to the aforementioned sieve, as a function of the concentration of different flocculating systems, whose percentage additions, based on the cement weight, are plotted on the abscissa. Curves 1 and 2 show the results when dissolving and reprecipitating aluminum sulphate or calcium sulphate. In this case, no significant filtration effect of the cement suspension can be obtained with the resulting flocculation systems. By adding a water-soluble polyacrylamide (Separan NP-10) with rising concentrations the sieve undersize material can be reduced to about 50%, as shown in Test No. 3 and curve 3. By means of the anionically stabilized copolymer acrylate emulsion (Primal N-1031) according to curve 4, it is possible to attain an increasing improvement of the filtration yield with rising concentrations of the flocculating agent. However, for a complete cement retaining capacity it would be necessary to use emulsion concentrations which no longer permit economic production of the composition.

Curves 5 and 6 show that it is surprisingly possible by means of the inventive combination of polymers and metal compounds to obtain a pronounced flocculation of the cement/fiber mixture, so that the cement undersize through the sieve is reduced to such an extent that it is possible to use such mixtures in industrial drainage systems.

The transfer of these results to an industrial production process will be illustrated by means of the following practical examples, which in no way restrict the invention. Although the invention is particularly invaluable in the production of asbestos-free products, it is also possible to replace part of the reinforcing fibers by asbestos fibers.

Unless indicated otherwise, the percentages in the following examples relate to the weight of the composition obtained. It is an easy matter for the person skilled in this field to modify the following examples as a function of the intended use of the composition by a suitable choice of fibers and/or process stages and apparatuses.

Example 1 (comparative example: asbestos cement, conventional production)

Canadian asbestos grade 4 was ground in a ratio of 1:3 with Soviet asbestos grade 5 for 30 minutes with 40% by weight of water in an edge mill. 153 kg (dry weight) of this asbestos mixture, was introduced into a rapidly operating vertical mixer containing 1.5 m³ of water and was further solubilized for 10 minutes. After pumping over into a horizontal mixer, 1 metric ton of Portland cement with a specific surface area of 3000 to 4000 cm²/g was admixed. The asbestos-cement slurry obtained was pumped into a machine chest and was then distributed on a Hatschek machine. With seven revolutions of the size roller, 6 mm sheets were produced on this machine and compressed between lubricated metal sheets to a thickness of 4.8 mm for 45 minutes in a stacking press at a specific pressure of 250 bar. The test took place after a setting time of 28 days. For the wet test, the sheets were further drained for 3 days. The test results are given in Table II.

Example 2 (comparative test, asbestos-free with sawdust as the filtering agent)

102 kg of sawdust were added to 1 m³ of water and pulped in a solvopulper for 10 minutes. 22 kg of polyvinyl alcohol fibers with a cut length of 6 mm were then added, the suspension was further diluted to 2.5 m³ and after pulping for 5 minutes was pumped over into a cement mixer. 1000 kg of cement with a specific surface area of approximately 3000 to 4000 cm²/g were mixed into this fiber suspension for 10 minutes. The mixture was then supplied to a machine chest of a Hatschek machine and further processed as described in example 1. The results are also given in Table II.

Example 3 (example according to the invention)

6.5 kg of industrial aluminum sulphate were dissolved in 2 m³ of water in a solvopulper and after adding 22 kg of polyvinyl alcohol fiber cut to 6 mm was pulped for a further 5 minutes. After pumping over into a cement mixer, 1000 kg of cement were mixed in during a period of 10 minutes and mixed with 1.2 kg of the polyacrylamide Separan NP-10 of Dow Chemical as a 0.5% aqueous solution. This flaky cement suspension was added to the chest of a Hatschek machine and further processed to sheets in the manner described in example 1. The results are once again given in Table II.

Example 4 (example according to the invention)

40 kg of slag wool were dispersed in 2 m³ of water in solvopulper. In the case of the slag wool used, which was produced by centrifuging, during production instead of the conventionally used mineral oils, a total of 2% by weight Separan NP-10 is sprayed on in the form of a 0.5% aqueous solution. 22 kg of polyacrylonitrile fibers cut to a length of 6 mm were admixed with the slag wool suspension prepared and after pulping for 5 minutes and pumping over into a cement mixer, 1000 kg of cement were admixed over a period of 10 minutes. Shortly before pumping over into the Matschek machine chest 65 liters of a 10% aluminum sulphate solution were added. Once again, the sheets were produced in accordance with example 1. The sheet strengths and data are given in Table II.

TABLE II

Test results of examples 1 to 4.

| Example No. | Reinforcing fibers, % by vol. | Cement retaining system/flocculating system | Dry flexural/tensile strength N/mm² | Wet flexural textile strength N/mm² | Density g/cm³ |
|---|---|---|---|---|---|
| 1 | Asbestos; 12 | Asbestos | 29.8 | 27.0 | 1.80 |
| 2 | Polyvinyl-alcohol; 4 | Sawdust | 27.2 | 22.4 | 1.66 |
| 3 | Polyvinyl-alcohol; 4 | Polyacrylamide; Al₂(SO₄)₃ | 28.0 | 26.2 | 1.90 |
| 4 | Polyacrylonitrile; 4 | Slag wool Polyacrylamide Al₂(SO₄)₃ | 26.8 | 24.2 | 1.84 |

The strength and density values relate to the shaped articles, as obtained by using the composition according to the invention.

The results clearly show that the process of the invention (examples 3 and 4) lead to fiber-reinforced cement products which, with regard to the differences between the wet and dry strength are superior to the hitherto known asbestos-free fiber cement products.

In view of the disclosure herein, it is likely that modifications and improvements will occur to those skilled in the art which are within the scope of this invention.

What is claimed is:

1. A process for producing a fiber-reinforced, hydraulically setting composition, said process comprising the steps of:

mixing reinforcing fibers and water together, said reinforcing fibers forming 0.5 to 20% by volume of said composition and being at least one of the organic and inorganic synthetic fibers selected from the group consisting of steel, glass, carbon, polyvinyl alcohol, polypropylene, viscose, acrylic, phenol formaldehyde, polyester, aromatic and aliphatic fibers;

combining the mixture of fiber and water with a hydraulic binder;

adding an aqueous solution of at least one of a water soluble and a water-emulsifiable polymer selected from the group consisting of polyacrylates, polyacrylamides and polyvinyl alcohol;

adding a metallic compound selected from the group consisting of divalent and polyvalent metal sulphates and metal hydroxides, said polymer and said metallic compound combining to function as a flocculating system in said composition, said metallic compound comprising in the range of 0.01 to 10% by weight of said composition; and then removing excess water from the thus formed mixture.

2. The process according to claim 1 and comprising the further step of adding at least one ingredient selected from the group consisting of fly ash, quartz, pearlite, rock wool and cellulose.

3. The process according to claim 1 wherein said metal sulphates are selected from the group consisting of aluminum sulphate and iron sulphate.

4. A fiber-reinforced, hydraulically setting composition produced by the process of claim 1.

5. A product formed from the composition made in accordance with the process of claim 1 and the further steps of:
 forming the composition into the desired shape selected from the group consisting of boards, corrugated boards and pipes; and
 allowing the product to set.

6. The product according to claim 5 and comprising the further step of further draining said composition prior to said forming step.

7. The product according to claim 6 wherein said further drainage takes place on apparatus selected from the group consisting of a circular sieve, endless wire, injection systems and filter presses.

8. The product according to claim 6 wherein said further drainage takes place on a winding machine.

9. The product according to claim 6 wherein said further drainage takes place on the basis of a continuous mono-strand process.

10. A fiber-reinforced, hydraulically setting composition having both high strength and high filtration characteristics comprising:
 a reinforcing fiber selected from the group consisting of steel, glass, carbon, polyvinyl alcohol, polypropylene, viscose, acrylic, phenol formaldehyde, polyester, aromatic and aliphatic fibers, said fiber forming 0.5 to 20% by volume of said composition and having lengths no greater than 0.025 meters;
 an hydraulic binder;
 at least one of a water soluble and a water emulsifiable polymer selected from the group consisting of polyacrylates, polyacrylamides and polyvinyl alcohol; and
 a metallic compound selected from the group consisting of divalent and polyvalent metal sulphates and metal hydroxides, said polymer and said metallic compound combining to function as a flocculating system in said composition, said metallic compound forming 0.01 to 10% by weight of said composition.

* * * * *